(12) United States Patent
Sharma et al.

(10) Patent No.: US 6,999,418 B2
(45) Date of Patent: Feb. 14, 2006

(54) SYSTEM AND METHOD FOR REDUCED FRAME FLOODING

(75) Inventors: Shantnu Sharma, Acton, MA (US); Stephen J. Unger, Allen, TX (US)

(73) Assignee: Fujitsu Limited, Kanagawa-ken (JP)

( * ) Notice: Subject to any disclaimer, the term of this patent is extended or adjusted under 35 U.S.C. 154(b) by 867 days.

(21) Appl. No.: 10/029,543

(22) Filed: Dec. 21, 2001

(65) Prior Publication Data

US 2003/0118035 A1    Jun. 26, 2003

(51) Int. Cl.
*H04J 1/16*    (2006.01)

(52) U.S. Cl. ...................................... 370/230; 370/389

(58) Field of Classification Search ............... 370/229, 370/230, 230.1, 231, 232, 233, 234, 235, 370/240, 252, 253, 351, 464, 389, 390, 392, 370/391, 393, 394
See application file for complete search history.

(56) References Cited

U.S. PATENT DOCUMENTS

| | | | | |
|---|---|---|---|---|
| 5,060,228 A | | 10/1991 | Tsutsui et al. | 370/85.13 |
| 5,325,356 A | * | 6/1994 | Lyles | 370/397 |
| 5,440,564 A | | 8/1995 | Ovada et al. | 370/112 |
| 5,790,546 A | | 8/1998 | Dobbins et al. | 370/400 |
| 5,982,775 A | * | 11/1999 | Brunner et al. | 370/401 |
| 6,023,563 A | | 2/2000 | Shani | 395/200.79 |
| 6,115,378 A | | 9/2000 | Hendel et al. | 370/392 |
| 6,163,543 A | | 12/2000 | Chin et al. | 370/400 |
| 6,175,575 B1 | | 1/2001 | Ahuja et al. | 370/524 |
| 6,185,214 B1 | | 2/2001 | Schwartz et al. | 370/401 |
| 6,188,690 B1 | | 2/2001 | Holden et al. | 370/390 |
| 6,195,356 B1 | | 2/2001 | Anello et al. | 370/398 |
| 6,216,167 B1 | * | 4/2001 | Momirov | 709/238 |
| 6,298,061 B1 | | 10/2001 | Chin et al. | 370/400 |
| 2001/0012296 A1 | | 8/2001 | Burgess et al. | 370/392 |
| 2001/0024443 A1 | | 9/2001 | Alriksson et al. | 370/401 |

* cited by examiner

*Primary Examiner*—Dang Ton
*Assistant Examiner*—Phuc Tran
(74) *Attorney, Agent, or Firm*—Weingarten, Schurgin, Gagnebin & Lebovici LLP

(57) ABSTRACT

A network device monitors the flooding of frames and obtains information to update a port's forwarding table to reduce unnecessary frame flooding. An unknown network address and a count are maintained at a first port, the unknown address being an address for which there is no information identifying another port to which unicast frames containing the address are to be forwarded, the count identifying the number of times frames containing the unknown address have been flooded from the first port to other ports. The count is incremented each time a unicast frame containing the unknown address is flooded from the first port to the other ports. When the count reaches a threshold, it is determined whether there is information at another port that identifies a specific port to which frames containing the unknown address are to be forwarded, and if so then the information is transferred to the first port, whereupon the unknown address becomes known at the first port. Subsequently, unicast frames received at the first port that contain the now known address are forwarded to only the specific port rather than being flooded.

14 Claims, 3 Drawing Sheets

SYSTEM AND METHOD FOR REDUCED FRAME FLOODING

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of communications network devices, and more particularly to network devices performing frame forwarding in communications networks.

Network devices in communications networks commonly carry out two related functions. One is frame forwarding, by which frames received at a given port are forwarded to one or more other ports for transmission toward their destination. Forwarding is typically carried out using "forwarding tables" existing at each port. The other function is address learning, which enables the device to accurately maintain address information in the forwarding tables for use in performing the forwarding function.

The forwarding of unicast frames generally works in the following manner. When a frame is received by the device, the forwarding table at the receiving port, or "ingress port", is consulted using the destination address (DA) from the frame. If there is an entry in the forwarding table for this address, the frame is forwarded to one other port of the network device as indicated by the entry. Otherwise, the frame is "flooded" to all other ports of the network device, on the assumption that the destination address is reachable via one of the other ports. Flooding is wasteful, however, because all but one of the transmissions from the other ports are unnecessary.

Addresses are learned at ports through "egress learning". As a frame exits the network device at a given port, the port uses the source address (SA) of the frame and the identity of the ingress port at which the frame was originally received to create or update an entry in its forwarding table. The addresses stored as entries in the forwarding table are compared with the DA of a received frame during the forwarding lookup discussed above. Once an address is "known" at a port, i.e., the port has an entry for the address in its forwarding table, the port need not flood frames containing that address.

Physical ports of a network device may be logically grouped into an "aggregated port" (AP), a single logical connection between the device and external equipment such as a bridge. In general, frames can be transferred between the device and external equipment via any of the physical ports of an aggregated port. Generally, a particular port is selected in some deterministic fashion, such as according to a hash function of a network address in a frame.

When an AP is employed, it is possible that frames being sent from a station attached to the AP that are destined for a station attached to another port of the device are transferred via one physical port of the AP, while frames being sent in the other direction between the two stations are transferred via another physical port of the AP. In this case, egress learning as described above may fail to terminate flooding in a timely manner. This happens because the ports use different forwarding tables, and the forwarding table used for forwarding frames in the one direction is not updated with the address information from frames flowing in the other direction. Thus, frames continue to be flooded in a wasteful manner, despite the existence of information at another port of the device that could be used to terminate the flooding.

BRIEF SUMMARY OF THE INVENTION

In accordance with the present invention, a network device is disclosed that monitors the flooding of frames and obtains information to update the forwarding table at a port to reduce the incidence of unnecessary frame flooding, resulting in more efficient operation of the device and a network in which the device is used. The functionality finds particular use in connection with aggregated ports, but may be used in other configurations as well.

The disclosed network device maintains an unknown address and a count at a first port, the unknown address being a network address for which there is no information at the first port identifying another port of the network device to which frames containing the unknown address are to be forwarded, and the count identifying the number of times frames containing the unknown address have been flooded from the first port to other ports of the network device. Upon the receipt of unicast frames containing the unknown address at the first port while the count is less than a predetermined threshold, the count is incremented and the received frames are flooded to the other ports of the network device. When the count has reached the predetermined threshold, it is determined whether there is information at a second port of the network device identifying a specific port to which unicast frames containing the unknown address are to be forwarded, and if so then the information is transferred from the second port to the first port, whereupon the unknown address becomes known at the first port. Subsequently, upon the receipt of unicast frames containing the now known address at the first port, the received frames are forwarded to only the specific port identified in the transferred information.

The disclosed device maintains unknown addresses and corresponding counts in separate bins, and creates and discards bins as necessary to monitor flooding. Timers may be used in connection with the bins to ensure that they are used for more active traffic streams. Thus, if a timer times out before the count in a given bin reaches the predetermined threshold, the bin is discarded. Additionally, if the number of active bins reaches some predetermined maximum, then the forwarding table at the port can be completely re-synchronized with the forwarding table(s) of one or more of the other ports, on the assumption that there may be several useful entries transferred that will obviate the monitoring of multiple addresses residing in the bins.

Other aspects, features, and advantages of the present invention will be apparent from in the detailed description that follows.

BRIEF DESCRIPTION OF THE SEVERAL VIEWS OF THE DRAWING

The invention will be more fully understood by reference to the following Detailed Description of the invention in conjunction with the Drawing, of which.

DETAILED DESCRIPTION OF THE INVENTION

Figure 1:
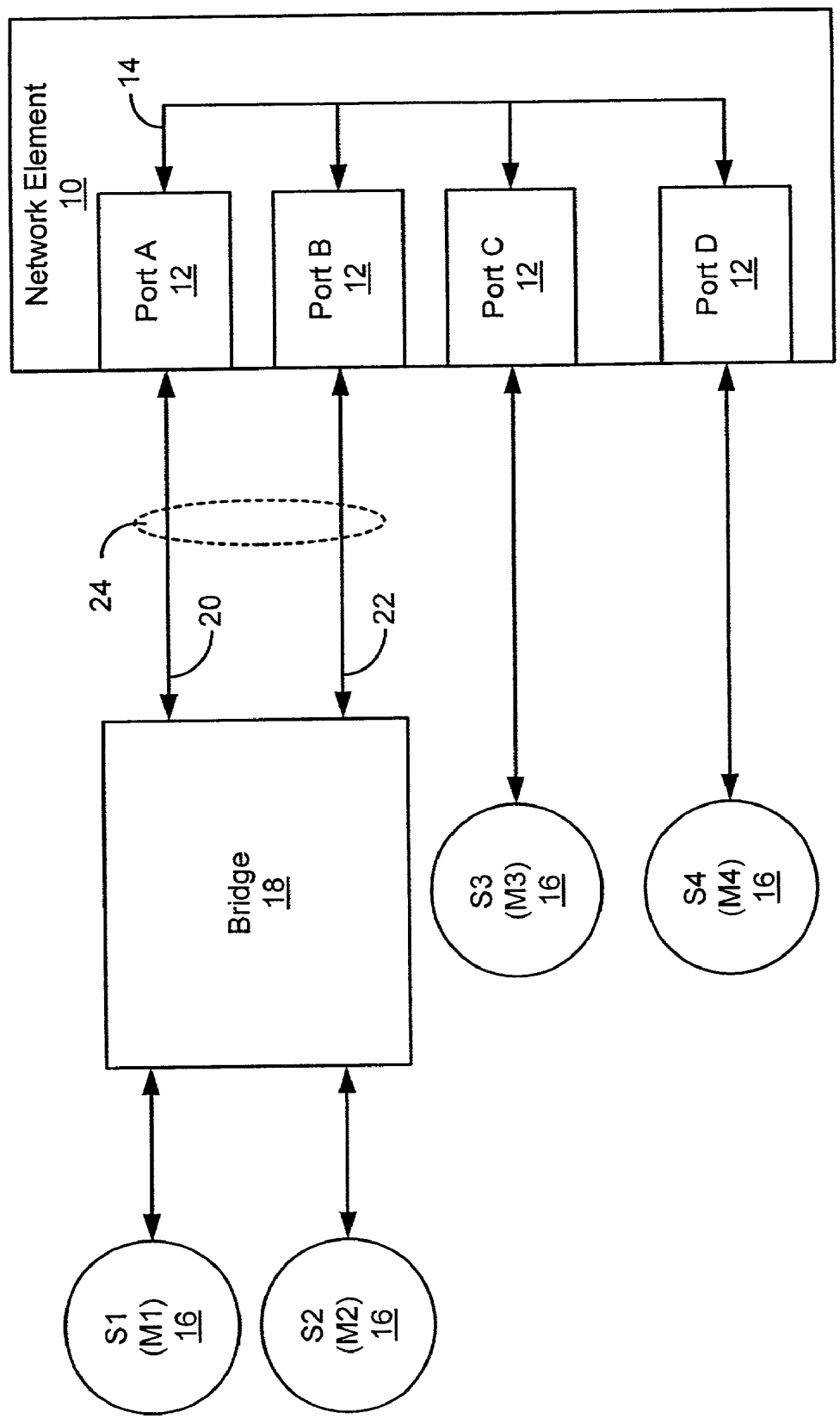
FIG. 1 is a block diagram of a network including a network device in accordance with the present invention.

In FIG. 1, a network element 10 such as a switch is shown having a number of ports 12, labeled "A" through "D". The ports 12 are interconnected by a data communication path 14 that enables the ports 12 to exchange network data frames and control messages. The network element 10 performs frame forwarding and related functions on behalf of a number of client nodes or "stations" 16. Each station 16 is labeled in FIG. 1 with a station name, such as "S1", and a station address, such as "M1". The addresses M1–M4 are media access control (MAC) addresses, such as Ethernet addresses.

As shown, stations S1 and S2 are connected to the network element 10 via a bridge 18, which has two connections 20 and 22 to ports A and B respectively of the network element 10. From the perspective of both the bridge 18 and the network element 10, ports A and B constitute a single "aggregated port" as indicated by a pairing 24 of the connections 20 and 22. In general, frames can be transferred between the network element 10 and the bridge 18 via either port A or B. Generally, a particular port is selected in some deterministic fashion, such as according to a hash function of a network address in a frame. However, the use of either port in particular is largely invisible from the perspective of forwarding software and hardware in the network element 10 and the bridge 18, which treat the two ports as a single logical entity having greater data carrying capacity than either port alone.

The network element 10 carries out two related functions. One is frame forwarding, by which frames received at a given port 12 are forwarded to one or more other ports 12 for transmission toward their respective destinations. Forwarding is carried out using "forwarding tables" existing at each port. The other function is address learning, which enables the network element 10 to maintain address information in the forwarding tables for use in performing the forwarding function.

Figure 2:
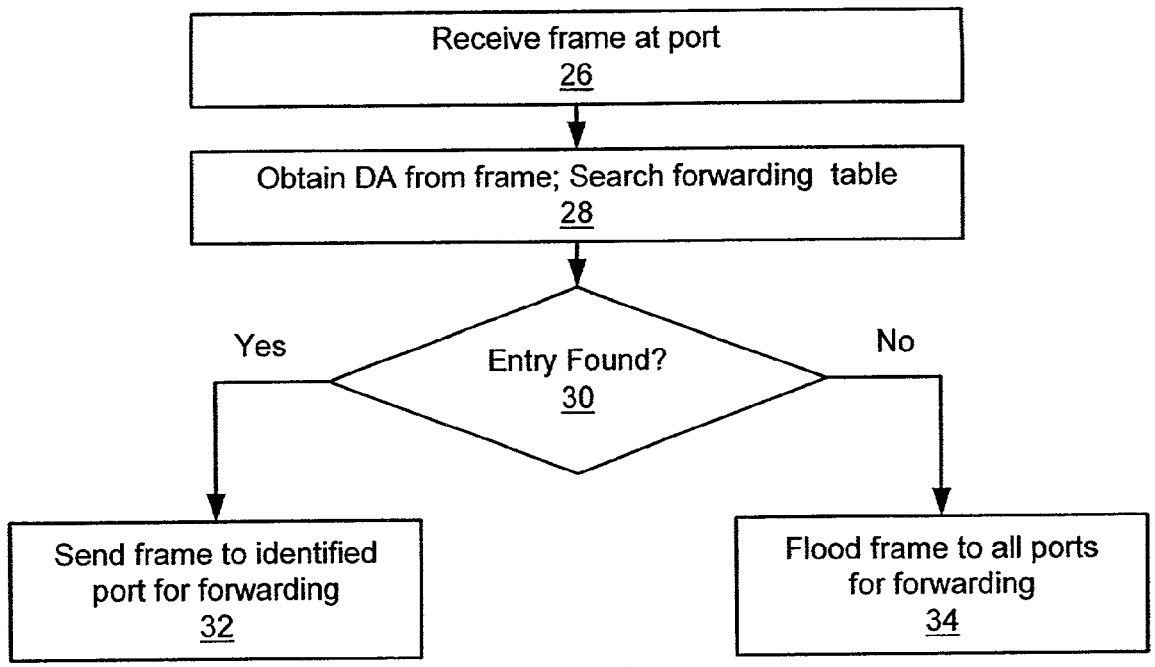
FIG. 2 is a flow diagram of a frame forwarding process as known in the art.

FIG. 2 depicts the forwarding of unicast frames. At step 26, a unicast frame is received at a given port 12, termed an "ingress" port, of the network element 10. At step 28, the destination address (DA) is obtained from the frame, and a forwarding table at the ingress port is accessed using the DA from the frame to ascertain the output port 12 to be employed. At step 30, it is determined whether an entry exists in the forwarding table for this DA. If so, then at step 32 the frame is forwarded to another port 12 of the network element 10 as identified by the entry, for re-transmission toward the destination station. In this case, it is said that the address is "known" at the port. If such an entry is not found, the address is said to be "unknown", and at step 34 the frame is "flooded" to all other ports 12 of the network element 10, on the assumption that the destination station is reachable via one of the other ports. As previously mentioned, such flooding of frames is generally wasteful of network switch resources and communication bandwidth, because all but one of the transmissions from the other ports 12 are generally unnecessary. Thus, it is preferred that most searches of the forwarding table result in finding an entry and the forwarding of frames to a single port as shown at step 32.

Figure 3:
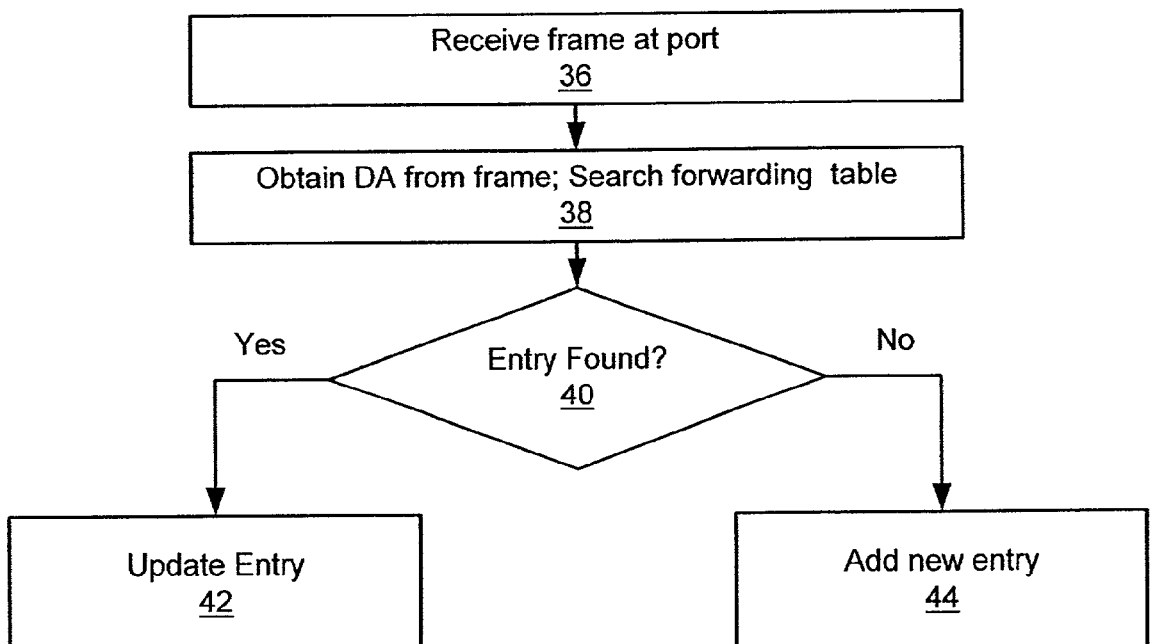
FIG. 3 is flow diagram of an address learning process as known in the art.

FIG. 3 shows the address learning process, which is referred to as "egress learning". At step 36, a frame is received at a port 12, referred to as an "egress port", from the ingress port via the communication path 14. At step 38, the egress port obtains the source address (SA) from the frame and performs a search of the egress port's forwarding table. At step 40, it is determined whether an entry is found. If so, then at step 42, the entry is updated. That is, the port identification in the entry is re-written with the identity of the ingress port from which the frame was received. In most cases, this updating is unnecessary, because the port associated with the address from the frame has not changed. However, the network or the network element 10 may have been re-configured since the last time frames from the station identified by the SA have been received. In this case, the updating of the entry results in correctly associating the address with a new port 12 of the network element 10 via which the corresponding station is now reached.

If at step 40 no entry is found in the forwarding table, then at step 44 a new entry is created and added to the table. This entry contains the SA and an identifier of the ingress port from which the egress port received the frame. This new entry is thus available in the forwarding table to be used for subsequent forwarding look-ups as described with reference to FIG. 2. In particular, subsequent forwarding look-ups for the same address result in the forwarding of the frames to a single port as at step 32 rather than the flooding of step 34.

Referring back to FIG. 1, there is a potential problem with the use of an aggregated port. Frames being sent from one station 16 to another station 16 in the network may be received at one port 12 of the aggregated port, while frames being sent in the other direction are transmitted via another port 12 of the aggregated port. For example, it may be the case that frames sent by station S1 to station S3 are received by the network element 10 at port B, whereas frames sent to station S1 from station S3 are transmitted to the bridge 18 from port A of the network element 10. The following table shows how the typical egress learning process such as that shown in FIG. 3 can fail to terminate flooding in such a case:

| Event | Port A | Port B | Port C | Port D |
|---|---|---|---|---|
| 1. S1 to S3 (flooded by B) | | | (M1, AP) | (M1, AP) |
| 2. S3 to S1 | (M3, C) | | | |
| 3. S1 to S3 (flooded by B) | | | | |

The above table shows the new entries that are created in the forwarding table of each port 12 as a result of each event. For the first transmission from S1 to S3, it is assumed that the frame arrives at port B of the aggregated port (AP). The destination address of M3 is unknown at port B, and therefore the frame is flooded to ports C and D. Each of these ports learns the address M1 and associates it with the aggregated port (AP) through the egress learning process.

For the second transmission, from S3 to S1, port C finds the address M1 in its forwarding table and sends the frame directly to the AP. It is assumed that the outbound frame is handled by port A of the AP. Port A transmits the frame to the bridge 18 for subsequent transmission to station S1, and also learns the address M3 and associates it with port C via egress learning. However, port B of the AP does not learn the address M3.

For the third transmission, port B still has no entry for address M3, and therefore floods the frame again. This occurs despite the fact that the address is known at port A, which is part of the same AP as port B. In the absence of any external correcting mechanism, this situation can exist for a considerable period, resulting in excessive and unnecessary flooding of frames within the network element 10.

It is assumed in the foregoing that each port 12 maintains its own forwarding table largely independently. This may be a generally desirable characteristic, especially when the ports 12 reside on different line cards or otherwise have relatively restricted ability to communicate with each other. In such multi-port network devices, there may be some type of periodic re-synchronizing of the forwarding tables of all the ports 12, or of all the ports 12 of a given AP, and this process can be relied upon to eventually propagate many new or updated forwarding table entries to ports at which they are needed. However, such a mechanism is resource-intensive and is generally performed relatively infrequently. Reliance upon this mechanism alone may result in relatively inefficient operation of the network element 10 and may not reduce the incidence of flooding to a desired degree.

To address this shortcoming of the normal address learning process in connection with aggregated ports, the network element 10 employs processes for monitoring the flooding of frames and sharing information among the ports 12 when the flooding of frames indicates that such sharing may be useful. These processes are described with reference to FIGS. 4 and 5.

Figure 4:
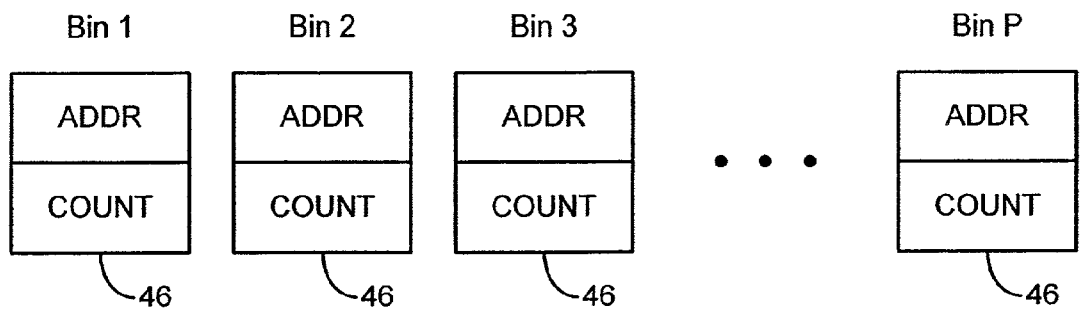
FIG. 4 is a diagram depicting a number of bins for maintaining unknown addresses and counts in the network device of FIG. 1.

FIG. 4 shows a number of bins 46 maintained at each port 12. The maximum number of bins, "P", is chosen based on various factors, such as the amount of available storage space, the frame reception rate, the rate of re-synchronization of the forwarding table contents as mentioned above, etc. Each bin 46 can store an address and a count. A bin 46 is used to store an address that has been determined to be unknown at the port and a count of the number of times frames containing that address have been flooded to the other ports 12 of the network element 10. The bins are allocated and utilized as described below with reference to FIG. 5.

Figure 5:
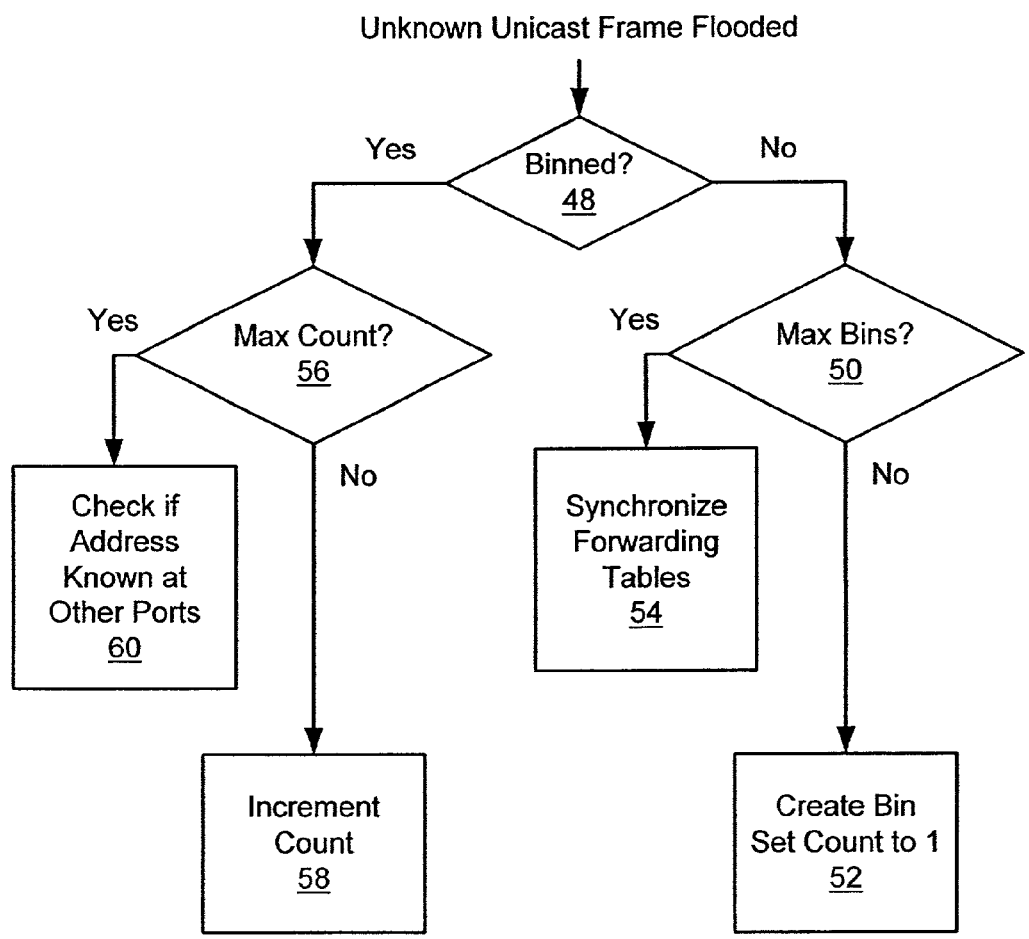
FIG. 5 is a flow diagram of a process of monitoring frame flooding and obtaining address information to reduce flooding in the network device of FIG. 1.

FIG. 5 shows the process of monitoring flooding and conditionally transferring information among the ports 12 for updating the port forwarding tables. When a unicast frame received at a port 12 is determined to be unknown and is therefore flooded to the other ports 12, it is determined at step 48 whether the DA of the frame has been "binned", i.e., occupies an active bin 46 with a corresponding count. If not, then at step 50 it is determined whether the maximum permissible number, P, of bins 46 are currently active. If not, then at step 52 a new bin 46 is created. The DA of the frame is written to the address portion of the bin 46, and the count is set to 1.

If at step 50 the maximum permissible number of bins 46 are determined to be active, then at step 54 a process for full re-synchronization of the forwarding tables of the ports 12 in the same aggregated port is performed. As a result of such re-synchronization, some or all of the addresses in the active bins 46 become known at the port. The active bins 46 are de-activated or discarded. If the address remains unknown at the port despite the re-synchronization, then it will likely be placed in a new bin 46 the next time a frame containing the address is flooded and the process of FIG. 5 is performed.

If at step 48 it is determined that a bin 46 for the unknown address is already active, then at step 56 it is determined whether the count in the bin 46 has reached a predetermined maximum value. This value is a parameter chosen to reflect a desired balance between undesirable frame flooding potentially unnecessary inter-port data transfer. If the maximum value is set too high, then frames containing this address will be flooded numerous times before action is taken to update the forwarding table. If the maximum value is set too low, inter-port data transfers may be requested unnecessarily for addresses that would otherwise be learned in due course via the regular egress learning mechanism.

If at step 56 the maximum count value has not been reached, then at step 58 the count is incremented. This action keeps track of the number of times frames containing this address have been flooded.

If at step 58 the maximum count value has been reached, then at step 60 it is determined whether this address is known at any of the other ports 12. If so, information identifying the port 12 associated with this address is transferred from such other port to the port 12 at which the address is unknown, and this port 12 uses the information to create a new entry in its forwarding table. The bin 46 for this address is then discarded.

It is preferable that there be a limit to how long each bin 46 can remain active, to help ensure that the bins 46 are used primarily for active traffic streams rather than inactive or very low-rate streams. If the time limit is exceeded before the count reaches the maximum value that triggers the inter-port information transfer of step 60, the bin is aged out and discarded. Such a time limit is preferably substantially less than the period of full re-synchronization of the forwarding tables, but should be sufficiently high to enable efficient use of the bins 46 for active streams.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A method of reducing flooding from a network device, comprising:

maintaining an unknown address and a count at a first port of the network device, the unknown address being a network address for which there is no information at the first port identifying another port of the network device to which unicast frames containing the unknown address are to be forwarded, the count identifying the number of times frames containing the unknown address have been flooded from the first port to other ports of the network device;

upon receiving a unicast frame containing the unknown address at the first port while the count is less than a predetermined threshold, incrementing the count and flooding the received frame to the other ports of the network device;

when the count has reached the predetermined threshold, determining whether there is information at a second one of the other ports of the network device identifying a specific one of the ports of the network device to which unicast frames containing the unknown address are to be forwarded, and if so then transferring the information from the second port to the first port, whereupon the unknown address becomes known at the first port; and upon receiving unicast frames containing the now known address at the first port, forwarding the received frames to only the specific port identified in the information transferred from such other port to the first port.

2. A method according to claim 1, wherein maintaining the unknown address and the count at the first port comprises:
   determining, upon flooding a unicast frame containing the unknown address, whether a bin has been established for the unknown address and the count; and
   if the bin has not been established, then establishing the bin and initializing the count to one.

3. A method according to claim 2, wherein establishing the bin comprises determining whether a predetermined maximum number of bins have already been established, and establishing the bin only if the predetermined maximum number of bins have not already been established.

4. A method according to claim 1, further comprising:
   maintaining a forwarding table at the first port, the forwarding table containing entries associating known addresses with corresponding ports;
   upon receiving the unicast frame, searching the forwarding table using the address contained in the frame to determine whether the address is known at the first port; and
   upon the transfer of the information from the second port, adding a corresponding entry to the forwarding table.

5. A method according to claim 4, further comprising participating in a periodic re-synchronization of the forwarding table with a forwarding table of the second port.

6. A method according to claim 1, further comprising monitoring how long the address and count are maintained, and upon maintaining the address and count for a predetermined maximum time before the count has reached the predetermined threshold, then discarding the address and count.

7. A method according to claim 1, wherein the first and second ports are included in an aggregated port appearing as a single logical port for frame forwarding purposes.

8. A network device, comprising:
   a plurality of line cards, each line card including a respective port, two of the ports being configurable as an aggregated port forming a single logical connection to another device;
   the port of a first one of the line cards being a first port operative to:
      (i) maintain an unknown address and a count, the unknown address being a network address for which there is no information at the first port identifying another port of the network device to which unicast frames containing the unknown address are to be forwarded, the count identifying the number of times frames containing the unknown address have been flooded from the first port to other ports of the network device;
      (ii) upon receiving unicast frame containing the unknown address from the other device while the count is less than a predetermined threshold, increment the count and flood the received frame to the ports of the other line cards;
      (iii) when the count has reached the predetermined threshold, determine whether there is information at the port of a second one of the line cards identifying a specific one of the ports of the network device to which unicast frames containing the unknown address are to be forwarded, and if so then obtain the information from the port of the second line card, whereupon the unknown address becomes known at the first port; and
      (iv) upon receiving unicast frames containing the now known address from the other device, forward the received frames to only the specific port identified in the information transferred from the port of the second line card to the first port; and
   the port of the second line card being a second port operative to:
      (i) receive unicast frames from ports of the other line cards and transmit the received frames to the other device;
      (ii) upon receiving unicast frames from ports of the other line cards, learn respective associations between addresses in the received frames and the ports from which the frames are received; and
      (iii) provide the information concerning the unknown address to the first port from the learned associations.

9. A network device according to claim 8, wherein the first port is further operative when maintaining the unknown address and the count to:
   determine, upon flooding a unicast frame containing the unknown address, whether a bin has been established for the unknown address and the count; and
   if the bin has not been established, then establish the bin and initialize the count to one.

10. A network device according to claim 9, wherein the first port is further operative when establishing the bin to determine whether a predetermined maximum number of bins have already been established, and establish the bin only if the predetermined maximum number of bins have not already been established.

11. A network device according to claim 8, wherein the first port is further operative to:
   maintain a forwarding table at the first port, the forwarding table containing entries associating known addresses with corresponding ports;
   upon receiving the unicast frame, search the forwarding table using the address contained in the frame to determine whether the address is known at the first port; and
   upon the transfer of the information from the second port, add a corresponding entry to the forwarding table.

12. A network device according to claim 11, wherein the first port is further operative to participate in a periodic re-synchronization of the forwarding table with a forwarding table of the second port.

13. A network device according to claim 8, wherein the first port is further operative to monitor how long the address and count are maintained, and upon maintaining the address and count for a predetermined maximum time before the count has reached the predetermined threshold, then discard the address and count.

14. A network, comprising:
   a plurality of stations;
   a bridge coupled to a first subset of the stations; and
   a network device coupled to the bridge and to a second subset of the stations via corresponding physical ports of the network device, the coupling between the network device and bridge being in the form of an aggregated port including at least first and second physical ports, the network device being operative to:
      (i) maintain an unknown address and a count at the first port of the network device, the unknown address being a network address for which there is no information at the first port identifying another port of the network device to which unicast frames containing the unknown address are to be forwarded, the count identifying the number of times frames containing the unknown address have been flooded from the first port to other ports of the network device;

(ii) upon receiving a unicast frame containing the unknown address at the first port while the count is less than a predetermined threshold, increment the count and flood the received frame to the other ports of the network device;

(iii) when the count has reached the predetermined threshold, determine whether there is information at the second port of the network device identifying a specific one of the ports of the network device to which unicast frames containing the unknown address are to be forwarded, and if so then transfer the information from the second port to the first port, whereupon the unknown address becomes known at the first port; and (iv) upon receiving unicast frames containing the now known address at the first port, forward the received frames to only the specific port identified in the information transferred from such other port to the first port.

* * * * *